United States Patent [19]
Champlin

[11] 3,873,911
[45] Mar. 25, 1975

[54] ELECTRONIC BATTERY TESTING DEVICE

[76] Inventor: Keith S. Champlin, 5437 Elliot Ave., Minneapolis, Minn. 55417

[22] Filed: Feb. 22, 1973

[21] Appl. No.: 334,667

Related U.S. Application Data
[63] Continuation of Ser. No. 180,340, Sept. 14, 1971, abandoned.

[52] U.S. Cl............................ 324/29.5, 340/249
[51] Int. Cl...................... G01n 27/42, G08b 21/00
[58] Field of Search............ 324/29.5, 62 R; 320/48; 340/249

[56] References Cited
UNITED STATES PATENTS
3,753,094   8/1973   Furuishi et al..................... 324/29.5

OTHER PUBLICATIONS
Hambuechen, C., Performance of Dry Cells, preprint of Am. electrochem. Soc., April 18-20, 1912, paper No. 19.
Willihnganz, E., "A Bridge for . . . ," The Electrochemical Society, Preprint 79-20, Apr. 1941, pg. 255-256.
Willihnganz, et al., "Battery Impedance," Electrical Engineering, Sept., 1959, pg. 922-925.

*Primary Examiner*—Alfred E. Smith
*Assistant Examiner*—Ernest F. Karlsen

[57] ABSTRACT

A self-contained electronic device for testing storage batteries is disclosed. The testing device is electrically connected to the battery undergoing test by means of special spring clips. Electronic circuitry in the testing device effectively detects and measures the battery's inverse dynamic resistance through the use of an oscillator operating at approximately 100 Hz. This detection and measurement is then displayed in units of dynamic power. Dynamic power is directly proportional to the inverse dynamic resistance and is found to an an accurate and sensitive indicator of the battery's condition and state-of-charge.

Two embodiments of the invention are described, the first being a modified bridge circuit to determine inverse dynamic resistance and the second being a direct reading instrument based on the use of dynamic resistance to control the negative feedback of a high-gain amplifier.

25 Claims, 11 Drawing Figures

INVENTOR.
Keith S. Champlin

BY
Schroeder Siegfried Ryan & Vidas
ATTORNEYS

INVENTOR.
Keith S. Champlin

BY
Schroeder Siegfried Ryan & Vidas
ATTORNEYS

INVENTOR
Keith S. Champlin

BY
Schroeder Siegfried Ryan Vidas
ATTORNEYS

ELECTRONIC BATTERY TESTING DEVICE

This is a continuation, of application Ser. No. 180,340, filed Sept. 14, 1971, now abandoned.

This invention relates to apparatus for determining the precise electrical condition of a storage battery of either the alkaline type or the conventional lead-acid type.

Storage batteries are employed in many applications in which electrical energy must be retained for later use. At the present time, the most common application of storage batteries is in motor vehicles utilizing internal combustion engines. The battery in such a vehicle is generally "charged" by means of a generator or alternator which derives its motive power from the engine. Energy is thus stored to be used later to operate lights, radio, and other electrical equipment. The largest demand upon the battery is usually made by the "self-starter" motor. In particular, with the engine stopped, several kilowatts of power may be required to crank the engine. Failure to satisfactorily perform this common task, particularly in cold weather, is the most frequent indication of battery deterioration or trouble with the charging system. Clearly, a simple measurement that accurately predicts the battery's ability to perform this task is of considerable value.

The principal object of the present invention is to provide a self-contained electronic test instrument for accurately predicting a storage battery's ability to supply power to a load.

A further object of this invention is to provide an instrument that can be operated by an average garage mechanic or service station attendant without any prior training or special skill.

Another object of this invention is to provide an instrument using temporary means for attaching the instrument to the battery without introducing significant errors due to the extraneous series resistance of the connecting wires or temporary contacts.

These and other objects of this invention will become apparent from a reading of the attached description together with the drawings wherein.

The traditional test for determining a storage battery's condition in the field is called a "discharge test." In a discharge test, one draws a large current (frequently hundreds of amperes) while simultaneously measuring the terminal voltage of the battery. If the terminal voltage drops below a predetermined value under heavy load, the battery is considered to be unsatisfactory. There are at least three disadvantages to the discharge test. First, because of the large currents drawn, the requisite equipment is heavy and cumbersome. Second, the test can be harmful to the battery if it is repeated too frequently or continued for too long. Third, the test is imprecise since the terminal voltage continually drops with time during discharge of the battery. Because of this latter problem, SAE Standard J 537 f (January, 1970) stipulates precise observation times of 30 and 90 seconds in the performance of laboratory "Cold-Cranking Tests."

Figure 1:
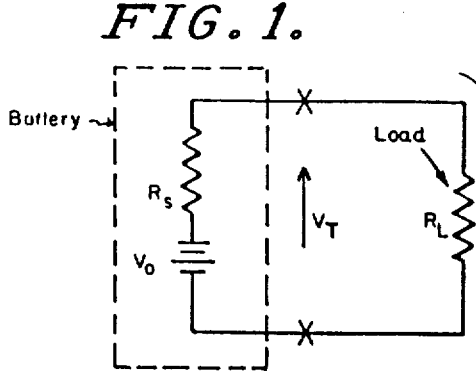
FIG. 1 shows an equivalent circuit of a storage battery and load resistance.
Figure 2:
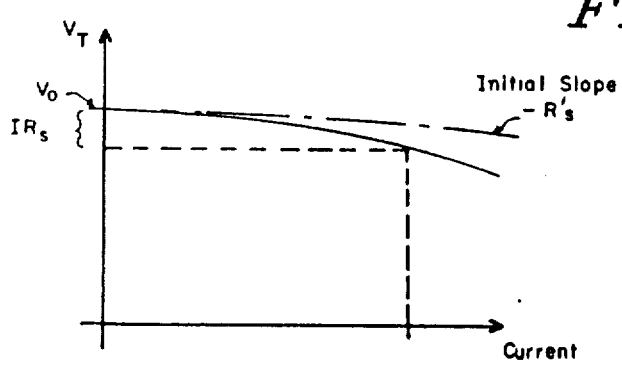
FIG. 2 is a graph of the terminal voltage of a typical storage battery as a function of load current.

A discharge test is essentially a measurement of the internal resistance $R_e$ of the battery. As seen in FIG. 1, the battery's internal resistance $R_e$ appears in series with the open circuit voltage $V_o$ in the equivalent circuit of the battery. When a current I flows through the load resistance $R_L$, the terminal voltage $V_T$ is equal to $V_o$ minus the internal drop ($IR_e$). Typical variation of terminal voltage with load current is shown in FIG. 2.

The present invention is a device for determining a storage battery's condition by utilizing an entirely different approach to measurement. Instead of drawing a large direct current from the battery, a small, time-varying signal is employed to determine the reciprocal of the battery's dynamic resistance $R_e'$. In this measurement, the dc battery voltage $V_o$ is suppressed, by means of appropriately placed capacitors.

The dc resistance $R_e$ measured in a discharge test and the dynamic resistance $R_e'$ do not generally agree with one another. This discrepancy is caused by the effects of heating, polarization, and diffusion which occur during a direct current discharge. The dc resistance $R_e$ is, in fact, a poorly defined quantity and varies with the discharge current as well as with time during discharge. On the other hand, the dynamic resistance $R_e'$ is precisely defined and represents the initial slope of the plot of terminal voltage versus load current as shown in FIG. 2. In general, the dc resistance $R_e$ is larger than the dynamic resistance $R_e'$ although $R_e$ may approach $R_e'$ for a pulsed load of short duration.

The power that a battery can deliver to a resistive load is a function of the load resistance $R_L$. If the load resistance is varied, maximum power will be delivered when the load is "matched" to the battery in the sense that $R_L = R_e$. Under this condition, the terminal voltage is ($V_o/2$) and the power delivered to the load is $$P_{max} = \frac{V_o^2}{4 R_e} \text{ watts} \qquad (1)$$

A storage battery is virtually never operated in its matched condition. Nevertheless, knowledge of $P_{max}$ would be extremely useful since it would provide a good indication of the state of charge and over-all condition of the battery. Since $R_e$ is such a poorly defined quantity, however, $P_{max}$ is difficult to determine with precision.

By analogy with $P_{max}$, I define the dynamic power $P_d$ of the battery as $$P_d = \frac{V_o^2}{4 R_o'} \text{ watts} \quad (2)$$

where $R_o'$ is the battery's dynamic resistance. The dynamic power $P_d$ is seen to be directly proportional to the inverse dynamic resistance. It represents an upper limit to the instantaneous power that could be delivered to a pulsed load of short duration. Unlike $P_{max}$, $P_d$ is a precisely defined quantity and can be readily calculated from knowledge of $R_o'$ and $V_o$.

Figure 3:
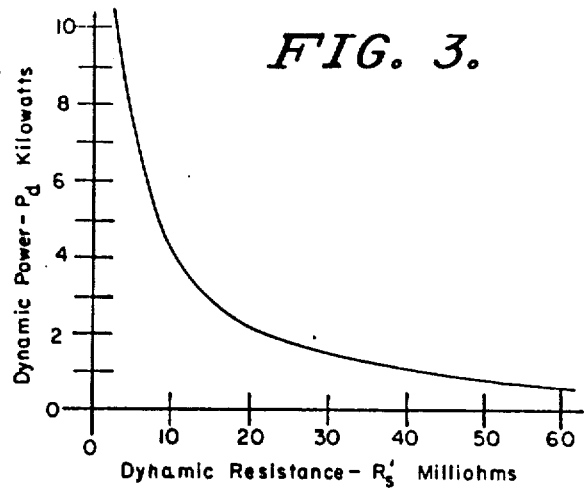
FIG. 3 shows the relationship between dynamic resistance $R_e'$ and dynamic power $P_d$ of a typical storage battery.

The open-circuit voltage $V_o$ of a lead-acid battery varies by less than ± 5 percent from the nominal value of 2.0 volts per cell throughout the entire range of discharge. For most practical purposes, therefore, one can assume $V_o$ to be constant in calculating $P_d$. FIG. 3 shows the relationship between $P_d$ and $R_o'$ for six-cell lead-acid batteries calculated from Eq. (2) by assuming that $V_o = 12$ volts. The range of values shown in FIG. 3 is typical of that encountered with automotive-type batteries.

Although dynamic power $P_d$ is not identical to $P_{max}$, it is nevertheless an important and useful quantity. In particular, I have found that $P_d$, as defined above, is closely related to the electrical energy actually stored in the battery. Measurements of $P_d$ thus provide a sensitive and accurate indication of the state of charge and over-all electrical condition of a storage battery. This fundamental principle provides the basis for my invention.

Extensive measurements of $P_d$ of automotive-type batteries using my invention have brought out the following results:

1. The dynamic power $P_d$ decreases by a factor of 3 or 4 during the course of discharging a battery from its fully charged state to its fully discharged state. Over this same range, the open-circuit voltage decreases by less than ten percent. Thus $P_d$ is a much more sensitive indicator of the state-of-charge than is $V_o$.

2. The dynamic power decreases fairly uniformly with time as a battery is discharged at constant current. On the other hand, because of the inverse relationship shown in FIG. 3, the dynamic resistance $R_o'$ changes very slowly at first and then increases at a rapidly accelerating rate as full exhaustion is approached. Therefore it is concluded that $P_d$ is much more directly related to the actual energy remaining in the battery than is $R_o'$.

3. The dynamic power of a fully charged battery in good condition increases with the battery's ampere-hour capacity as specified by the manufacturer.

4. The dynamic power of a fully charged battery decreases quite linearly with decreasing temperature in the range between 70° and 0° F.

5. Abnormal sulfation is accompanied by a marked reduction in dynamic power. Decreases in dynamic power $P_d$ by factors of 3 to 10 have been observed with batteries stored for several months in the discharged state before recharging.

6. Identical new batteries from the same manufacturer give the same readings of dynamic power to within several percent. Measurements of $P_d$ are thus well-defined and highly repeatable.

From the above results, it is obvious that dynamic power $P_d$ as defined above, is indeed a reliable indicator of the over-all electrical condition of the battery.

One sees from FIG. 3 that the dynamic resistance of an automotive-battery is typically only a few milliohms (1 milliohm = 0.001 ohms). Such small values present significant measurement problems. Heretofore, the small-signal ac impedance of storage batteries has been measured in scientific laboratories only. These measurements were performed in the course of scientific investigations under highly controlled conditions and employed fairly sophisticated bridge techniques. However, such laboratory techniques would not be suitable for routine testing of storage batteries by unskilled personnel in a field environment. In particular, the accuracy of the laboratory measurements has been critically dependent uponn making extremely low-resistance connections to the battery. Such connections are not practical in the field. Furthermore, the laboratory bridges have required balancing reactance as well as resistance. An unskilled operator would find such a complex measurement procedure very confusing. Finally, the laboratory bridges have contained highly specialized components such as standard inductances, standard capacitances, and special low-value resistances which are not ordinarily found outside of the scientific laboratory.

By making extensive measurements, I have determined that the reactive effects noted in the laboratory measurements can be avoided by choosing the measurement frequency to be sufficiently low. The reactance of a storage battery was found to arise from two sources:

1. The geometry of the plates and connectors inside the battery results in an inductance in series with $R_o'$. Since $R_o'$ decreases as the battery energy increases, this series inductance is most important in large, heavy-duty batteries that are fully charged.

2. As a battery discharges, its active lead is converted into lead sulphate, an insulator. This produces a capacitance in parallel with $R_o'$ which increases in value as discharge progresses. Parallel capacitance is most important for large values of $R_o'$ (weak batteries).

I have found with automotive type batteries, that the reactance from both sources is negligible in comparison with $R_o'$ at frequencies below about 300 Hz. Thus, in both embodiments of the invention described below, the principal frequency components of the time-varying signal are restricted to be in this range.

Both embodiments of my invention can be used to determine the condition of a storage battery by measuring its dynamic power. Both embodiments have been designed for testing 12-volt lead-acid batteries of the type and size used in automobiles, although the invention is not restricted to this use. By straightforward extensions of these designs, apparatus can be built for testing alkaline type batteries; batteries with terminal voltages other than 12 volts; and batteries with either larger or smaller ampere-hour capacities than those found in automobiles.

The first embodiment employs a balanced bridge circuit in which the battery undergoing test constitutes one arm. This bridge has certain similarities to bridges that have been employed in laborabory measurements of ac impedance but differs from such bridges in a number of important regards. The second embodiment is a direct-reading device based on the theory of feedback amplifiers. Although these two embodiments are electrically different from one another, they have the following features in common;

1. Both embodiments employ self-contained oscillators to generate a time-varying signal.

2. Both embodiments contain electrical means for detecting and measuring the battery's inverse dynamic resistance. These electrical means include appropriately placed capacitors to block the flow of dc by suppressing the battery's steady emf.

3. Both embodiments display the results of this measurement in units of dynamic power; i.e., units that are directly proportional to the inverse dynamic resistance of the battery under test.

4. Both embodiments obtain their dc power from the battery undergoing test.

5. Both embodiments employ special double-contact spring clips to make temporary connections to the battery without introducing errors due to the extraneous resistances of the contacts and connecting wires.

Figure 4:
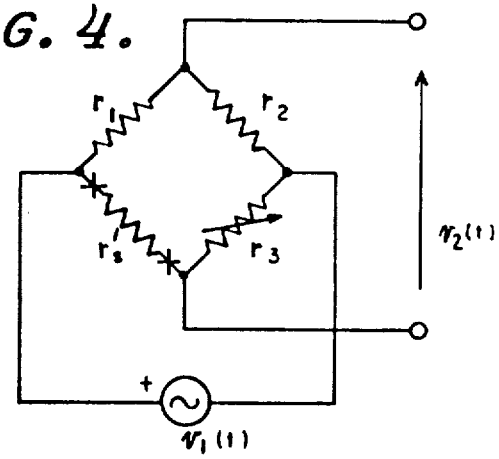
FIG. 4 is a schematic diagram of a conventional Wheatstone bridge.

Except for the reactive elements they contained, the laboratory bridges have been of the conventional Wheatstone type. Such a bridge is shown in FIG. 4. As is well known, the output voltage $v_2$ is at a null when the four resistances satisfy the relation $$r_s' \, r_2 = r_1 \, r_3 \quad (3)$$

According to conventional procedure, $r_3$ is a variable resistance while $r_1$ and $r_2$ are fixed resistances denoted as "ratio arms." Rearranging Equation (3) yields $$r_s' = (r_1/r_2) r_3 \quad (4)$$

showing that $r_s'$ is proportional to $r_3$ at balance.

Figure 5:
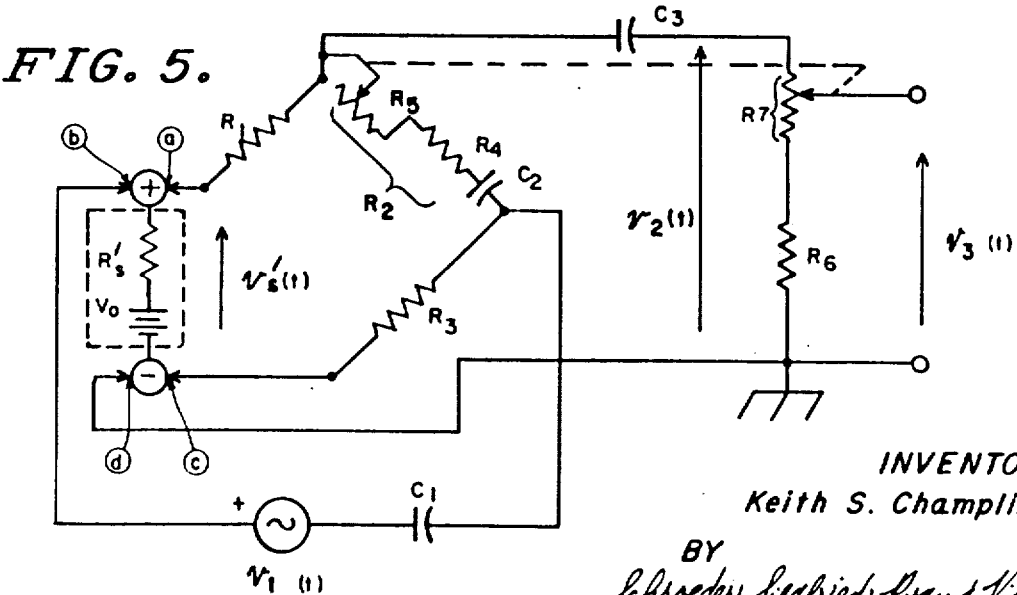
FIG. 5 is a schematic diagram of a modified bridge used in a first embodiment of the battery testing device.

The modified Wheatstone bridge employed in the first embodiment of my battery testing device is shown schematically in FIG. 5. Capacitors $C_1$, $C_2$, and $C_3$ are used to block the flow of dc battery current in the bridge elements and associated circuitry. Their capacitance values are chosen to be sufficiently large that their reactance is negligible at the measurement frequency.

By comparison to FIG. 4, the variable resistance arm ($R_2$) of the modified bridge in FIG. 5 is seen to be diagonally across from the unknown element ($R_s'$) rather than adjacent to it as in a conventional Wheatstone bridge. According to Equation (3), this variable resistance ($R_2 = r_2$) is then inversely proportional to ($R_s' = r_s'$) at balance. Equation (2) shows that the battery's dynamic power $P_d$ is likewise inversely related to $R_s'$. Eliminating $R_s'$ between Equations (2) and (3) yields $$P_d = \left[ \frac{V_s^2}{4 R_1 R_3} \right] R_2 \text{ watts} \quad (5)$$

in which $R_1 = r_1$ and $R_3 = r_3$ are constants. Thus, with the modified bridge as shown in FIG. 5, the dynamic power $P_d$ is linearly related to the resistance of the variable arm at balance. Resistance $R_2$ consists of a fixed resistor $R_4$ in series with a variable resistor $R_5$ having a "linear-taper" (i.e., a linear relation between resistance and shaft rotation angle.) As a result, the angular position of the knob affixed to $R_5$ is linearly proportional to the battery's dynamic power in watts. This is highly desirable from the standpoint of accuracy as well as convenience.

The bridges used in laboratory measurements of ac impedance have all been quite "symmetrical" in the sense that one of the arms adjacent to the battery arm (either $R_1$ or $R_3$) had a resistance value comparable to $R_s'$. The modified bridge of the first embodiment of the battery testing device is made extremely unsymmetrical by choosing both $R_1$ and $R_3$ to be at least 1,000 times larger than the minimum value of $R_s'$ to be measured. This modification eliminates the need for special low-value laboratory-type resistances (such as, e.g., a specially machined constantan rod of precise length). In addition, it permits making temporary connections to the battery with special double-contact spring clips without introducing significant errors.

Two insulated contacts on the clip (FIG. 5) are attached to the positive battery terminal at $a$ and $b$, and two insulated contacts on the clip attached to the negative terminal at $c$ and $d$. It will be seen that the two wires at either end of the unknown arm in FIG. 4 make separate contact to the battery terminal in the modified bridge of FIG. 5. The advantage of this modification is that the resistance of contact $a$ and its associated lead wire are now electrically part of the $R_1$ bridge arm rather than part of the $R_s'$ arm as in a conventional bridge. Similarly, the resistance of contact $c$ and its associated wire are part of the $R_3$ arm. Since both $R_1$ and $R_3$ are very large compared with $R_s'$, the relative effect of any extraneous resistance is greatly diminished. Contact $b$ along with its lead wire and contact $d$ along with its lead wire are electrically located in the generator and null indicator circuits, respectively, and their extraneous resistances will therefore not affect the balance of the bridge. It will be noted that these special double-contact spring clips are only effective in eliminating errors caused by extraneous contact resistances because of the unsymmetrical bridge design.

The following resistance values apply to the modified bridge shown in FIG. 5:

$R_1 = 10\Omega$; $R_3 = 5\Omega$
$R_4 = 1K\Omega$; $R_5 = 10K\Omega$; variable (linear-taper)
$4.55 \times 10^{-3}\Omega \leq R_s' \leq 50 \times 10^{-3}\Omega$ Because $R_s'$ can vary by more than a factor 10 without exceeding the limits of the bridge, a wide measurement range presents a further problem. The ac voltage $v_s'$ developed across the battery will likewise vary over a very wide range. As a result, an ac output voltmeter that provides a good null indication for one battery may have either too much or too little sensitivity for an accurate null indication with another battery. One solution to this problem is to provide a separate control with which the operator can adjust the output voltmeter sensitivity to suit the resistance of the element being tested.

The present embodiment of the battery testing device avoids a separate sensitivity adjustment by automatically "leveling" the bridge output voltage with potentiometer $R_7$ (FIG. 5). The shaft of $R_7$ is "ganged" to variable resistance $R_5$ so that the two controls rotate together. This automatic leveling circuit functions as follows: Since $R_3 >> R_s'$, the ac voltage developed across the battery is:

$$v_s' = v_1 (R_s'/R_3)$$

which from Equation (3) can be written:

$$V_s' = V_1(r_1/r_2) = (V_1 R_1)/(R_4 + R_5) \quad (6)$$

where $r_2 = R_4 + R_5$

Assuming negligible "loading" by the voltmeter circuit, the output voltage is:

$$v_3 = v_2 \left[ \frac{R_4 + R_7}{R_4 + R_7 \text{ (max)}} \right] \quad (7)$$

By multiplying and dividing the right hand portion of Equation (7) with Equation (6) and rearranging the terms, it may be shown that:

$$v_3 = \left[ \frac{R_4 + R_7}{R_4 + R_3} \quad \frac{v_1 R_1}{R_4 + R_7 \text{ (max)}} \right] (v_2/v_1') \quad (8)$$

Thus, by choosing $(R_4 + R_7)/(R_4 + R_3)$ to be constant, the bridge output voltage is made a fixed proportion of the unbalance ratio $(v_2/v_1')$ regardless of the magnitude of $v_1'$.

In the first embodiment of the invention, $R_7$ is a 100 ohm, linear-taper, potentiometer and $R_4$ is 10 ohms. Since $R_3$ is a 10K ohm, linear-taper potentiometer and $R_1$ is 1,000 ohms; $(R_4 + R_7)/(R_4 + R_3)$ has the constant ratio (1/100) for all shaft positions of the dual element control. It is worthwhile noting that this technique for automatically leveling the bridge output voltage relies on having an inverse relationship between the variable bridge arm and $R_1'$ and would not be possible if the variable arm were adjacent to the unknown arm as in a conventional Wheatstone bridge.

Figure 8:
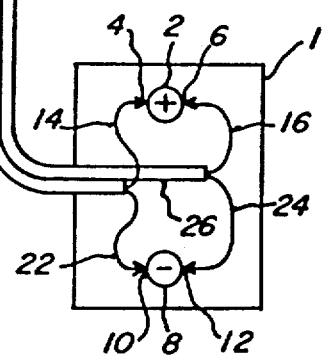
FIG. 8 is a schematic diagram of the first embodiment of the battery testing device.
Figure 8:
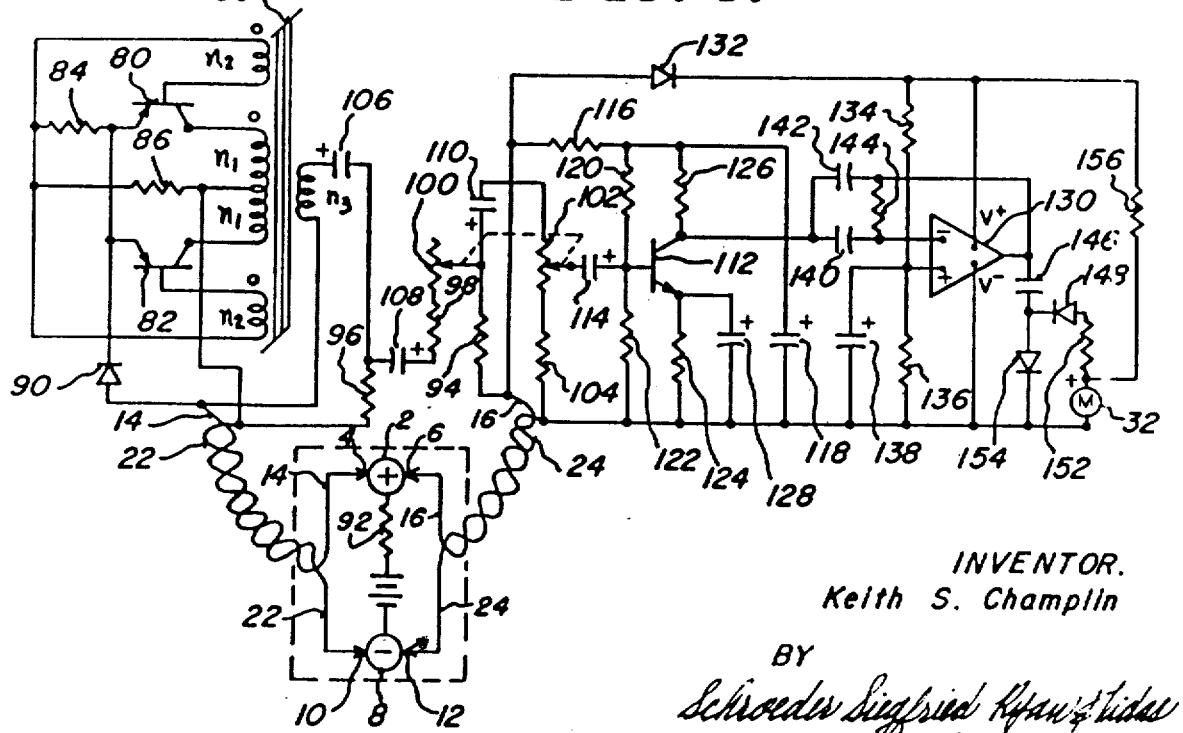

A schematic diagram of the first embodiment of the invention is shown in FIG. 8. The bridge is excited by a 100 Hz square wave generator comprising generally a pair of transistors 80 and 82 along with a pair of bias resistors 84 and 86, and a saturable (square-loop) transformer 88. The oscillator is powered by the 12 volt battery undergoing test through positive red lead 14 and negative black lead 22. A rectifier 90 is placed in series with the positive power lead to protect transistors 80 and 82 should the battery polarity be inadvertantly reversed.

The bridge circuit consists of the battery's internal dynamic resistance 92($R_x'$), a resistor 94 ($R_1$), a resistor 96($R_3$) a resistor 98($R_4$), and a variable resistance 100 ($R_3$). The output of the bridge is "leveled" by a potentiometer 102($R_7$) along with a resistor 104($R_4$) connected in series with the resistive element of potentiometer 102. A capacitor 106 ($C_1$) blocks direct current from the secondary windings of transformer 88. A capacitor 108 ($C_2$) blocks direct current from bridge resistors 94, 96, 98, and 100. A capacitor 110($C_3$) blocks direct current from potentiometer 102 and resistor 104.

A null amplifier and null indicator circuit are powered by the 12 volt battery undergoing test through red (positive) wire 16 and black (negative) wire 24. The first stage consists of a transistor 112 having its input coupled in common-emitter fashion to potentiometer 102 by means of a capacitor 114. A resistor 116, along with a capacitor 118 provide power supply decoupling for this stage. Bias and operating points for transistor 112 are established by four resistors 120, 122, 134, and 126. An emitter bias resistor 124 is by-passed with a capacitor 128. The voltage gain of this first amplification stage is approximately 50.

The second stage of amplification utilizes an integrated-circuit operational amplifier 130. Besides providing a voltage gain of approximately 100, this stage serves two further purposes 1. It amplifies only a narrow band of frequencies (bandwidth approximately 20Hz). It thus filters out the fundamental (100 Hz) component of the bridge output signal and rejects noise and other spurious signals. Both functions tend to improve measurement precision by increasing the sharpness of the null at bridge balance.

2. It has a saturating input-output characteristic and thus provides large gain for small input signals and small gain for large input signals. This characteristic increases the dynamic range of the null indicator and permits high null sensitivity without the possibility of damaging the null meter when the bridge is far from balance.

A diode 132 is inserted in series with the positive power lead of operational amplifier 130 to protect it from possible damage caused by inadvertently reversing the battery polarity. The noninverting input of amplifier 130 is biased by a pair of resistors 134 and 136 while being held at ac ground potential by a capacitor 138. A pair of capacitors 140 and 142 along with a resistor 144 provide selective feedback from output to input of operational amplifier 130 and determine the gain, bandwidth, and center frequency of this stage.

The output of the null amplifier is coupled to a null indicator circuit by a capacitor 146. This ac signal is half-wave rectified by a diode 148 and the resultant direct current is applied to a milliameter 32 through a series resistor 152. A diode 154 provides a current path through capacitor 146 during the reverse half of the ac cycle to prevent capacitor 146 from becoming charged.

A steady dc bias current is applied to milliameter 32 by means of a resistor 156. The direction of this current is such as to cause milliameter 32 to deflect to the right. A resistor 156 is chosen so as to provide nearly full scale deflection when the output of the null amplifier is zero. Because of the direction of current flow through diode 148, the rectified null signal subtracts from the steady dc bias current and thus reduces the total deflection of milliameter 32. Resistor 152 is chosen so that the total meter current is nearly zero when the bridge is far from balance (operational amplifier saturated).

Because of the above null indicator circuit design, the needle of null meter 32 moves to the right as bridge balance is approached. This is opposite to what is ordinarily found with laboratory bridges. Tuning for maximum deviation is believed to be considerably more natural than tuning for minimum deviation, and thus, it is expected that this indicator circuit will simplify operation of the battery testing device for use by unskilled personnel.

A list of component types and values for the first embodiment of the battery testing device follows.

| REFERENCE NOS. | COMPONENT |
|---|---|
| Semiconductor Devices | |
| 80, 82 | 2N555 pnp transistors |
| 112 | 2N3394 npn transistor |
| 130 | µA741 operational amplifier (manufactured by Fairchild Semiconductor) |
| 132, 148, 154 | 1N34A diodes |
| 90 | 1N536 rectifier |
| Resistors | |
| 84 | 15 ohm; ½ watt |
| 86 | 680 ohm; ½ watt |
| 94 | $R_1$ — 10 ohm; ½ watt |
| 96 | $R_3$ — 5 ohm; 5 watt |
| 98 | $R_4$ — 1K ohm; ½ watt |

-Continued

| REFERENCE NOS. | COMPONENT |
|---|---|
| 100 | $R_s$ — 10K ohm variable; linear taper |
| 102 | $R_f$ — 100 ohm pot.; linear taper |
| 104 | $R_a$ — 10 ohm; ½ watt |
| 116 | 1K ohm; ½ watt |
| 120 | 10K ohm; ½ watt |
| 122 | 2.2K ohm; ½ watt |
| 124 | 390 ohm; ½ watt |
| 126 | 1.5K ohm; ½ watt |
| 134,136 | 39K ohm; ½ watt |
| 144 | 220K ohm; ½ watt |
| 152 | 3.3K ohm; ½ watt |
| 156 | 12K ohm; ½ watt |

Capacitors

| | |
|---|---|
| 106 | 4K μfd, 15v — electrolytic |
| 108,114 | 40 μfd, 15v — electrolytic |
| 110,118 | 400 μfd, 15 v — electrolytic |
| 128 | 1K μfd, 6v — electrolytic |
| 138 | 10 μfd, 6v — electrolytic |
| 140,142 | 0.008 μfd, paper-film tubular |
| 146 | 2.0 μfd, paper |

Transformer

| | |
|---|---|
| 88 | Magnetics, Inc. toroid 50034-2A |
| | Windings: $n_1$ — 480 turns; No. 32 |
| | $n_2$ — 4K turns; No. 32 |
| | $n_3$ — 200 turns; No. 26 |

Meter

| | |
|---|---|
| 32 | Milliammeter; 1 ma full scale. |

Figure 6:
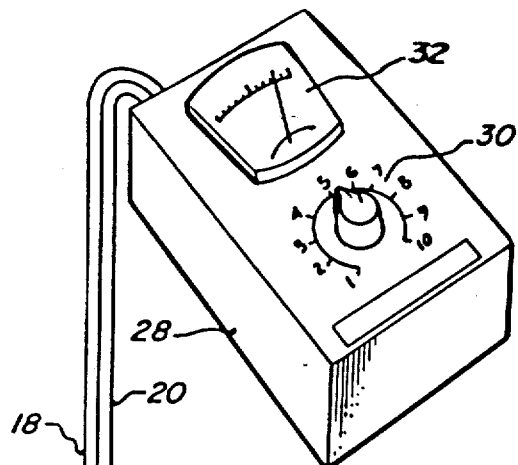
FIG. 6 is an external diagramatic view of the first embodiment of the battery testing device.
Figure 7:
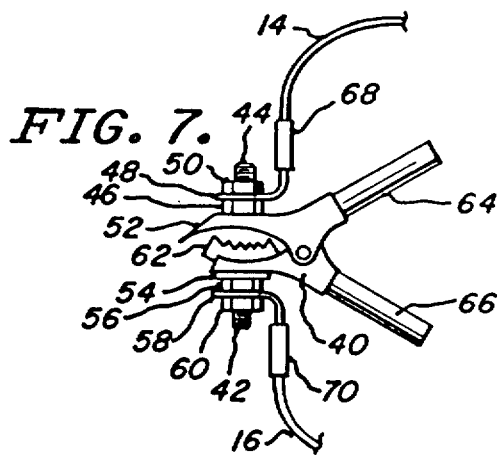
FIG. 7 is a detailed view of one of a special double-contact spring clip used to connect the device to a battery undergoing test.

A detailed view of one of a pair of double-contact spring clips is shown in FIG. 7. In the first embodiment of the invention, a clip 40 is shown as a modification of a conventional spring-type battery slip. Holes are drilled through both jaws to permit passage of a pair of 8-32 machine screws 42 and 44. A nut 46 is tightened onto screw 44 followed by a lug 48 and another nut 50. Red wire 14 is connected to lug 48 and is thus in direct electrical connection with jaw 52. The hole permitting passage of screw 42 through the other jaw is slightly oversize to prevent electrical contact between the screw and the jaw. Screw 42 is further insulated from the main body of the battery clip by means of a fiber washer 54 and a second fiber washer (not shown) on the inside of the jaw. A nut 56 is tightened down onto screw 42 followed by a lug 58 and a nut 60. The head of machine screw 42 is soldered or welded to a special contact 62, having a saw-tooth appearance for gripping the battery post. Red wire 16 is connected to lug 58 and is thus in direct electrical connection with special contact 62. The two diametrically opposed contact areas 4 and 6 (FIG. 6) are thus provided by jaw 52 and special contact 62. Clip 40 is identified as being used on the positive terminal of the battery by red markings on a pair of handles 64 and 66 along with a pair of red plastic sleeves 68 and 70 on lugs 48 and 58. Plastic sleeves 68 and 70 further serve to physically separate wires 14 and 16 by approximately 4 inches to reduce the mutual inductance between them. Except for coloration, the negative clip is of identical construction as the positive clip.

Referring to FIG. 6, the battery testing device, contained generally in a housing 28, is temporarily connected to the battery undergoing test by means of the special double-contact spring clip 40 shown in detail in FIG. 7. One clip, identified by red markings, contacts the positive terminal 2 of a battery 1 at diammetrically opposed contact areas 4 and 6. Another clip, mechanically and electrically the same as clip 40, but identified by black markings, contacts the negative terminal 8 at diametrically opposed contact areas 10 and 12. Red wires 14 and 16 leading from contacts 4 and 6 respectively, are brought to housing 28 through flexible vinyl insulators 18 and 20, respectively. Similarly, black wires 22 and 24, leading from contacts 10 and 12 respectively, are brought to housing 28 through flexible vinyl insulators 18 and 20 respectively. Each vinyl insulator in the form of a tube contains both a black wire and a red wire which are twisted together within the tube to minimize inductance. Vinyl tube 20 extends beyond tube 18 by a length 26 of approximately 4 inches in order to reduce mutual inductance between wires 14 and 16 and between wires 22 and 24.

With the battery tester thus connected, a pointer knob 30 gang connected to variable resistor 100 and potentiometer 102 is adjusted so as to advance the indicator needle of a meter 32 to a maximum value. Once this adjustment has been accomplished by knob 30, the battery's dynamic power $P_d$, is read directly from a circumferential linear scale adjacent knob 30.

The second embodiment of the battery testing device is a direct-reading instrument based on the use of $R_s'$ to vary the gain of a high-gain amplifier by controlling its negative feedback. The basic circuit is shown schematically in FIG. 9. A differential amplifier is used which has an input-output relationship that is given by $$v_3 = A_o \, [e_2 - e_1] \tag{9}$$

where $A_o$ is the gain of the differential amplifier, $v_3$ is the output voltage, and $e_1$ and $e_2$ are the voltages at the inverting input and non-inverting input, respectively. The dynamic battery resistance $R_s'$ along with fixed resistor $R_1$ constitutes a feedback network which applies a portion of the ac output voltage $v_3$ back to the amplifier input. Capacitors $C_1$, $C_2$ and $C_3$ are used merely for the purpose of blocking direct current and are chosen such that their reactance is negligible at the frequency of the ac oscillator producing $v_1(t)$.

Figure 9:
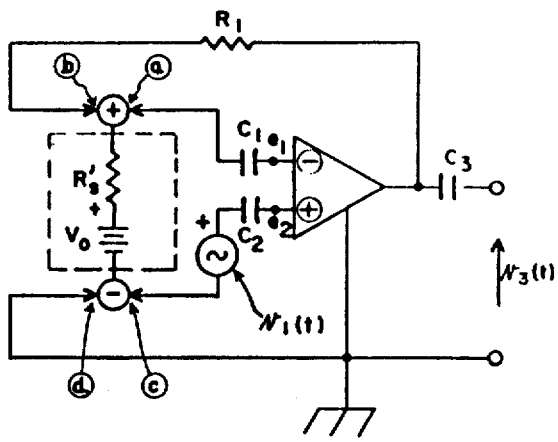
FIG. 9 is a simplified schematic diagram showing the basic circuit of the second embodiment of the battery testing device.

Applying Equation (9) to the circuit of FIG. 9, and assuming that $R_s' >> R_1$, yields $$v_3 = A_o \, [v_1 - (R_s'/R_1) \, v_3] \tag{10}$$

Rearranging Equation (10) leads to $$v_3 = \left[ \frac{A_o \, (R_1/R_s')}{(R_1/R_s') + A_o} \right] v_1 \tag{11}$$

which for $A_o >> (R_1/R_s')$ can be written $$v_3 = \frac{R_1 v_1}{R_s'} \tag{12}$$

Thus, according to Equation (12), the ac output voltage $v_3$ is independent of the open loop gain $A_o$ and is inversely related to the battery's dynamic resistance $R_s'$. Combining Equations (12) and (2) thus yields $$P_d = \left[ \frac{V_o^2}{4 R_1 v_1} \right] v_3 \text{ watts} \tag{13}$$

With this circuit, the battery's dynamic power $P_d$ is linearly proportional to the amplifier's output voltage $v_3$. A linear output voltmeter can therefore be linearly calibrated in units of $P_d$. This is a highly desirable feature from the standpoints of both accuracy and convenience.

As with the first embodiment, a measurement problem arises because of the extremely small values of $R_s'$ encountered in practice. Again, special double-contact spring clips are used to make temporary connections to the battery without introducing significant errors due to the spurious resistances of the contact and lead wires.

The two separate connections to the positive battery terminal are at $a$ and $b$ and those to the negative terminal are at $c$ and $d$ of FIG. 9. With this arrangement, the resistances of contacts $a$ and $c$ and their associated lead wires are electrically part of the input circuit of the differential amplifier. Since the impedance of this circuit is in excess of 1,000 ohms, any spurious resistances at contacts $a$ and $c$ will have virtually no effect. The resistances of contacts $b$ and $d$ are electrically part of the feedback network and are in series with $R_1$. In the second embodiment of my invention, $R_1$ is equal to 10 ohms and is thus very large compared with $R_s'$. Any spurious resistances at contacts $b$ and $d$ will therefore also have relatively little effect.

Figure 10:
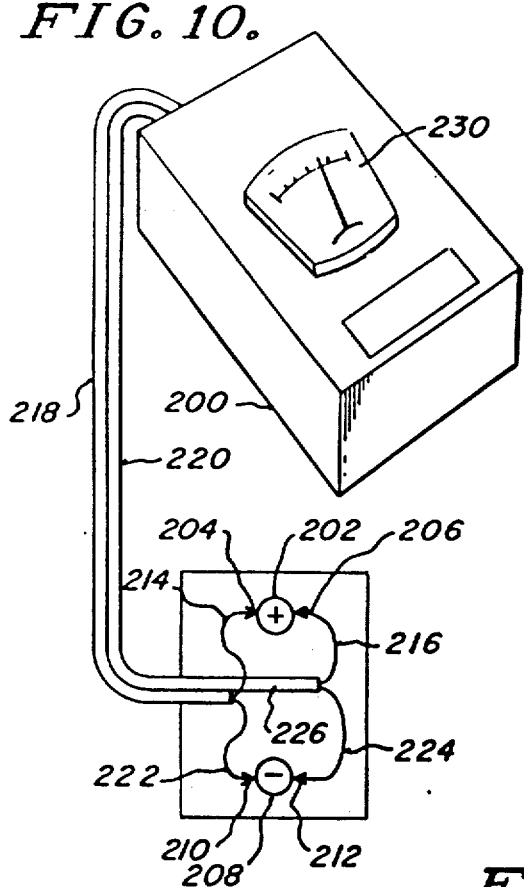
FIG. 10 is an external diagramatic view of the second embodiment of the battery testing device.

Referring now to FIG. 10, the battery testing device, contained generally in housing 200, is temporarily connected to the battery undergoing test by means of special double contact spring clips as shown in detail in FIG. 7. One clip, identified by red markings, contacts a positive terminal 202 of the battery at a pair of diametrically opposed contact areas 204 and 206. The other clip, identified by black markings, contacts a negative terminal 208 of the battery at a pair of diametrically opposed contact areas 210 and 212. A pair of red wires 214 and 216, leading from contacts 204 and 206 respectively, are brought to housing 200 through flexible vinyl insulators 218 and 220 respectively. Similarly, a pair of black wires 222 and 224, leading from contacts 210 and 212, respectively, are brought to housing 200 through flexible vinyl insulators 218 and 220, respectively. Each insulator in the form of a vinyl tube contains a black wire and a red wire which are twisted together to minimize inductance. Vinyl tube 220 extends beyond tube 218 by a length 226 of approximately 4 inches in order to reduce mutual inductance between wires 214 and 216 and between wires 222 and 224.

With the second embodiment of the battery tester thus connected, the indicator needle of a meter 230 points directly to a scale showing the battery's dynamic power $P_d$ in kilowatts. The second embodiment is thus a direct reading instrument as opposed to the balanced bridge of the first embodiment.

Figure 11:
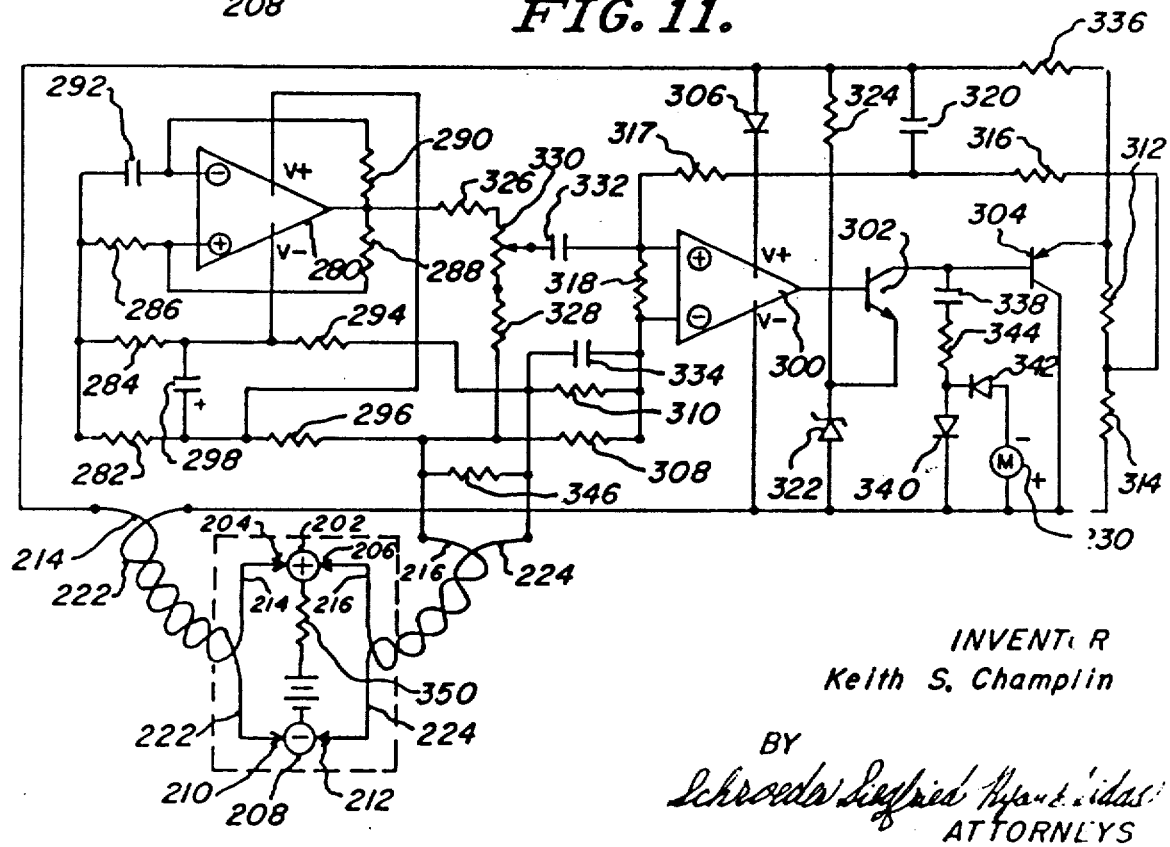
FIG. 11 is a schematic diagram of the second embodiment of the battery testing device.

A schematic diagram of the second embodiment is shown in FIG. 11. A 90 Hz square wave is generated by an operational amplifier 280 along with resistors 282, 284, 286, 288, 290 and a capacitor 292. This oscillator circuit obtains its requisite dc power from the battery undergoing test through positive red lead 216 and negative black lead 224.

A pair of resistors 294 and 296 along with a capacitor 298 will provide power supply decoupling for the oscillator circuit as well as protection for operational amplifier 280 in case of unintentional reversal of the battery polarity.

The non-inverting input of operational amplifier 280 is biased to nearly one-half the battery voltage by means of equal resistors 282 and 284. In addition, resistors 286 and 288 provide a positive feedback which "latches" the operational amplifier into either of two stable operating conditions of positive saturation or negative saturation. A resistor 290 along with a capacitor 292 form a timing circuit that provides negative feedback to the inverting input of operational amplifier 280. At the beginning of a cycle, capacitor 292 charges through resistor 290. When its voltage reaches the drop across resistor 286, the input voltage to operational amplifier 280 becomes zero and the amplifier shuts "off." Since this condition is unstable, the circuit immediately latches into saturation of the opposite polarity and the sequence repeats. The output of operational amplifier 280 thus switches between $V^+$ and $V^-$ at a rate determined by the time constant values of resistor 290 and capacitor 292.

The characteristics of the above described oscillator circuit are ideally suited to the present application. The oscillator output voltage $v_1(t)$ is proportional to the battery voltage $V_a$ and is virtually independent of environmental factors such as temperature, humidity, and changes in component values due to aging. Thus, besides avoiding errors caused by spurious changes in $v_1(t)$, this circuit provides a first-order correction to $P_d$ for small variation in battery voltage $V_a$ (see Eq. [13]).

A high-gain differential amplifier is excited by the oscillator and consists of an integrated-circuit operational amplifier 300 followed by a npn transistor 302 and a pnp power transistor 304. All three semiconductor devices obtain their requisite dc powers from the 12-volt battery undergoing test through positive red lead 214 and negative black lead 222. A diode 306 is inserted in series with the positive power supply lead of operational amplifier 300 to prevent damage should the battery polarity be inadvertently reversed. Operational amplifier 300 provides a voltage gain of about 5,000 at 90 Hz; transistor 302 provides a 180° phase shift and an additional voltage gain of about 100; transistor 304 provides unity voltage gain along with a power gain of about 50 as required to drive the low-impedance ac feedback circuit. The overall open-loop voltage gain of the amplifier is therefore about 500,000. Since the maximum value of $(R_1/R_s')$ is about 3000, this is sufficiently large to insure that Equation (12) is well justified. The dc operating point of the inverting (−) input of operational amplifier 300 is maintained at approximately one-half the battery voltage by means of a pair of bias resistors 308 and 310. Direct-current feedback from the output of transistor 304 to the non-inverting (+) input of operational amplifier 300 is provided by a pair of voltage divider resistors 312 and 314 along with three feedback resistors 316, 317 and 318. A bypass capacitor 320 insures that alternating current is prevented from being fed back to the amplifier input by this dc feedback circuit. The purpose of the dc feedback circuit is to stabilize operation of the overall amplifier under various conditions of temperature and circuit parameters and to fix the operating point of transistor 304. The dc operating point of transistor 302 is held fixed by a Zener diode 322 along with a resistor 324.

The 90 Hz square wave output of operational amplifier 280 is attenuated by two resistors 326 and 328 along with a trimmer potentiometer 330. The purpose of trimmer potentiometer 330 is to provide means for initially adjusting $v_1(t)$ so that the instrument reads correctly when measuring a battery of known dynamic power. Because of the linearity of Equation (13), the instrument will then read correctly with all other batteries. In practice, the first embodiment of the battery testing device is used to initially determine the dynamic power of a single battery. That battery is then employed as a "standard" to initially calibrate other units of the second embodiment.

The attenuated ac voltage appearing across resistor 328 and potentiometer 330 is connected in series with the ac voltage developed across the dynamic battery resistance 350 by means of red wire 216 and black wire 224. The sum of these two ac voltages is then applied to the differential input of operational amplifier 300 by means of a pair of blocking capacitors 332 and 334.

Negative ac feedback from the output of power transistor 304 is fed back to dynamic resistance 350 by resistor 336, red wire 214 and black wire 222. This ac feedback circuit is thus completely separate from the dc feedback circuit described above. Resistor 336 serves two functions in providing the negative feedback path for alternating current ($R_1$ of FIG. 9), and also establishing emitter bias for transistor 304. Note that this arrangement eliminates the need for a blocking capacitor in the low-impedance output circuit of power transistor 304.

The output of transistor 302 is coupled to the ac voltmeter circuit by means of a capacitor 338. The ac voltmeter consists of a pair of diodes 340 and 342 in half-wave rectifier connection, a series resistor 344 and a dc microammeter 230. Microammeter 230 is linearly calibrated in units of dynamic power (kilowatts) as shown in FIG. 10. Another resistor 346 prevents meter transients which might occur if black lead 224 were removed from the battery before black lead 222.

A list of component types and values for the second embodiment of the battery testing device follows:

| REFERENCE NO. | COMPONENT |
|---|---|
| Semiconductor Devices | |
| 280,300 | μA741 operational amplifiers (Fairchild semiconductor) |
| 302 | 2N3392 transistor |
| 304 | 2N555 transistor |
| 306,340,342 | 1N34A diodes |
| 322 | 1N750A Zener diode |
| Resistors | (½ watt; 10% tolerance unless specified) |
| 282,284,308,310 | 220 K ohm |
| 286 | 150 K ohm |
| 288,290 | 1.5 M ohm |
| 294,296 | 1 K ohm |
| 312 | 820 K ohm |
| 314,317 | 2.2 M ohm |
| 316 | 10 M ohm |
| 318 | 100 K ohm |
| 324 | 330 ohm |
| 326 | 2.7 M ohm |
| 328 | 270 ohm |
| 330 | 500 ohm trimmer pot.—linear taper |
| 336 | 10 ohm — 5 watt |
| 344 | 18 K ohm |
| 346 | 10 K ohm |
| Capacitors | |
| 292,320 | 0.022 μfd; 200V |
| 298 | 25 μfd; 15V — electrolytic |
| 332,334,338 | 0.47 μfd; 200V |
| Meter | |
| 230 | Microammeter: 50μA full scale |

Having thus described my invention, it should be understood that the invention is not limited to the particular applications and designs detailed above. In particular, the invention is applicable to the testing of any source of dc electrical power such as, e.g., primary batteries, solar batteries, thermionic generators, fuel cells, and thermoelectric generators as well as storage batteries. Further, other alternative designs will be apparent to one who is skilled in the art. It is intended by the appended claims to cover all such applications and variations that fall within the scope of this invention.

What is claimed is:

1. A measuring device for assessing the condition of a direct current source of electricity comprising:
   a. means providing a time-varying signal;
   b. electrical connecting means constructed and arranged to be connected to each output terminal of said direct current source of electricity, each of said connecting means containing both a first conductor and a second conductor separately contacting each of said terminals, said first and second conductors reducing the effects of contact and lead-wire resistance;
   c. electrical means for applying a time-varying current derived from said time-varying signal through said direct current source of electricity by means of a pair of said first conductors, for sensing the resultant time-varying potential across said direct current source of electricity by means of a pair of said second conductors, and for utilizing said time-varying potential to determine the reciprocal of the dynamic resistance of said direct current source of electricity at frequencies such that the reactive component of the ac impedance of said direct current source is substantially small in comparison with the resistive component of same;
   d. and indicating means connected to said electrical means including pointer means and scale means, the position of said pointer means relative to said scale means during measurement being substantially proportional to the reciprocal of the dynamic resistance of said direct current source of electricity, said scale means subsequently relating said relative position to the condition of said direct current source of electricity.

2. Apparatus as set forth in claim 1 wherein said electrical means and said indicating means include a variable electrical element and an output detector, said position of said pointer means relative to said scale means being specified by the value of said variable electrical element required to obtain a predetermined condition of said output detector.

3. Apparatus as set forth in claim 1 wherein said electrical means and said indicating means include an electrical meter, said position of said pointer means relative to said scale means being specified by the signal applied to said electrical meter.

4. Apparatus as set forth in claim 1 wherein said electrical means includes a bridge circuit excited by said time-varying signal, said bridge circuit containing said direct current source in its unknown arm and variable resistance means in the arm diagonally opposite, said bridge circuit being modified by extending the two conductors which define each end of said unknown arm so that they make separate contact with the output terminals of said direct current source by means of said first and second conductors of said electrical connecting means, said electrical means further including means for amplifying the output voltage of said bridge and means for detecting the condition of minimum output voltage, said position of said pointer means relative to said scale means being specified by the value of said variable resistance means required to obtain minimum time-varying output voltage.

5. Apparatus as set forth in claim 4 wherein the bandwidth of said amplifying means, defined by halfpower frequencies, is less than 25 percent of the frequency of maximum amplification.

6. Apparatus as set forth in claim 4 wherein the output voltage of said amplifying means saturates when said bridge is unbalanced.

7. Apparatus as set forth in claim 4 wherein said detecting means includes a dc milliammeter biased to nearly full scale deflection with direct current, and a rectifier rectifying the output of said amplifying means so that it subtracts from the total positive milliammeter current.

8. Apparatus as set forth in claim 4 wherein the output voltage of said bridge circuit is applied to, and attenuated by, a potentiometer ganged to said variable resistance.

9. A measuring device for assessing the condition of a direct current source of electricity comprising:
   a. means providing a time-varying signal;
   b. electrical connecting means constructed and arranged to be connected to each output terminal of said direct current source of electricity;
   c. high gain amplifier means;
   d. means capacitively coupling across the input of said high gain amplifier means, the combination of said means providing a time-varying signal and said direct current source of electricity through said electrical connecting means;
   e. feedback means coupling a signal representative of the output of said high gain amplifier means across said direct current source of electricity by means of said electrical connecting means; and
   f. voltmeter means connected to said high gain amplifier means for displaying readings representative of the amplitude of the time-varying output signal thereof, said voltmeter means relating said readings to the condition of said direct current source of electricity.

10. Apparatus as set forth in claim 9 wherein said time-varying signal contains frequency components to cause the reactance of said direct current source of electricity to be substantially small in comparison with its dynamic resistance.

11. Apparatus as set forth in claim 9 wherein said means providing same time-varying signal includes an oscillator contained in said measuring device which generates said time-varying signal.

12. Apparatus as set forth in claim 11 wherein said oscillator generates a square wave having amplitude proportional to the supply voltage of said oscillator.

13. Apparatus as set forth in claim 9 including variable attenuator means connected between the output of said means providing a time-varying signal and said high gain amplifier means to permit initial calbration of said measuring device.

14. Apparatus as set forth in claim 9 wherein the last stage of said high gain amplifier means includes a power transistor having a load resistor providing a feedback path to said direct current source of electricity.

15. Apparatus as set forth in claim 1 wherein said means providing a time-varying signal and said electrical means are electrically energized from said direct current source of electricity.

16. Apparatus as set forth in claim 9 wherein said means for providing a time-varying signal and said high gain amplifier means are electrically energized from said direct current source of electricity.

17. Apparatus as set forth in claim 1 wherein said scale means is calibrated in units that are directly proportional to the power delivering capability of said direct current source.

18. Apparatus as set forth in claim 1 wherein said means providing the time-varying signal includes an oscillator contained in said measuring device which generates said time-varying signal.

19. Apparatus as set forth in claim 1 wherein said electrical connecting means includes spring actuated clips providing temporary contact to the output terminals of said direct current source.

20. Apparatus as set forth in claim 1 wherein said electrical connecting means includes spring actuated clips, each of said clips containing both a first conductor and a second conductor providing separate temporary contact to said output terminals.

21. Apparatus as set forth in claim 9 wherein each of said electrical connecting means contains both a first conductor and a second conductor separately contacting said output terminals, a pair of said first conductors providing a conducting path for coupling a current representative of the output signal of said high gain amplifier means through said direct current source of electricity and a pair of said second conductors providing a separate conducting path for coupling the resultant time-varying voltage developed across said direct current source back to the combination of said means providing a time-varying signal and the input of said high gain amplifier means.

22. Apparatus as set forth in claim 9 wherein said electrical connecting means includes spring actuated clips providing temporary contact to said output terminals.

23. Apparatus as set forth in claim 9 wherein said voltmeter means is calibrated in units that are directly proportional to the power delivering capability fo said direct current source of electricity.

24. Apparatus as set forth in claim 9 wherein said voltmeter means is calibrated in watts.

25. Apparatus as set forth in claim 9 wherein said high gain amplifier means has a differential input, each terminal of which is capacitively coupled to the series combination of said means providing a time-varying signal and said direct current source of electricity.

* * * * *